(12) United States Patent
Moon

(10) Patent No.: US 7,016,010 B2
(45) Date of Patent: Mar. 21, 2006

(54) METHOD OF FABRICATING A SYSTEM-ON-PANEL TYPED LIQUID CRYSTAL DISPLAY

(75) Inventor: Dae-Gyu Moon, Anyang (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/985,914

(22) Filed: Nov. 12, 2004

(65) Prior Publication Data

US 2005/0088580 A1   Apr. 28, 2005

Related U.S. Application Data

(63) Continuation of application No. 09/212,657, filed on Dec. 15, 1998.

(30) Foreign Application Priority Data

Jan. 26, 1998   (KR) ..................................... 98-2350

(51) Int. Cl.
 *G02F 1/13*   (2006.01)
 *G02F 1/1345*   (2006.01)
(52) U.S. Cl. ...................... 349/187; 349/151
(58) Field of Classification Search ............ 349/41–43, 349/187, 151
See application file for complete search history.

(56) References Cited

U.S. PATENT DOCUMENTS

| 5,605,846 A | * | 2/1997 | Ohtani et al. ............... 438/487 |
| 5,696,388 A | | 12/1997 | Funada et al. |
| 6,066,518 A | * | 5/2000 | Yamazaki .................... 438/166 |
| 6,147,667 A | | 11/2000 | Yamazaki et al. |

FOREIGN PATENT DOCUMENTS

| JP | 7-99314 | 4/1995 |
| JP | 8-313935 | 11/1996 |
| KR | 1998-064841 | 10/1998 |
| WO | 97/45827 | 12/1997 |

OTHER PUBLICATIONS

James S. Im, et al., *Crystalline Si Films for Integrated Active-Matrix Liquid-Crystal Displays*, MRS Bulletin, Mar. 1996, pp. 39-48.
James S. Im, et al., *Single Crystal Silicon Films Via a Low-Substrate-Temperature Excimer-Laser Crystallization Method*, MRS Abstract 1996 Fall Meeting.
J. P. Leonard, et al., *The Effect of Film Thickness and Pulse Duration Variation in Excimer-Laser Crystallization of Thin Si Films*, Mat. Res. Soc. Symp. Proc. vol. 452, pp. 947-952, 1997.

(Continued)

Primary Examiner—Dung T. Nguyen
(74) Attorney, Agent, or Firm—McKenna Long & Aldridge LLP

(57) ABSTRACT

A system-on-panel typed liquid crystal display has active layers of single crystalline silicon for fabricating such high speed circuits as drivers, controllers, and central process units. By forming such active layer on a common substrate, the high speed circuits can coexist with lower speed pixel array. As a result, the system-on-panel LCD enables the efficient fabrication of a pixel array, a driver, a controller and a CPU circuit on the same substrate, whereby the fabrication process is simplified and production yields are increased. Moreover, the present invention facilitates the fabrication and manufacture of portable LCD products which are significantly reduced in weight and size because the space occupied by the controller and the CPU circuit is markedly and desirably reduced.

26 Claims, 6 Drawing Sheets

OTHER PUBLICATIONS

R.S. Sposili, et al., *Single-Crystal Si Films Via a Low-Substrate-Temperature Excimer-Laser Crystallization Method*, Mat. Res. Soc. Symp. Proc. vol. 452, pp. 953-958, 1997.

J. S. Im, et al., *Single-Crystal Si Films for Thin-film Transistor Devices*, Appl. Phys. Lett. 70 (25), pp. 3434-3436, Jun. 23, 1997.

M.A. Crowder, et al., *Low-Temperature Single-Crystal Si TFTs Fabricated on Si Films Processed Via Sequential Lateral Solidification*, IEE Electron Device Letters, pp. 1-3, Sep. 1997.

J. S. Im, et al., *Controlled Super-Lateral Growth of Si Films for Microstructural and Optimization*, Physics Status Solid, pp. 1-7 w/8 pages of figures, Feb. 22, 1998.

* cited by examiner

Relate Art

First irradiated region

Second irradiated region
First irradiated region

Laser beam translation direction
= Crystallizing direction

METHOD OF FABRICATING A SYSTEM-ON-PANEL TYPED LIQUID CRYSTAL DISPLAY

This application is a continuation of application Ser. No. 09/212,657, filed Dec. 15, 1998 which claims priority to Korean Patent Application No. 1998-2350, filed Jan. 26, 1998, each of which are incorporated by reference for all purposes as if fully set forth herein.

BACKGROUND OF THE INVENTION

1. Field of the Invention

The present invention relates to a system-on-panel typed liquid crystal display, and more particularly, a system-on-panel including active layers of single crystalline silicon for use with a driver, a controller, and a central processing unit.

2. Description of the Related Art

Liquid crystal display (hereinafter LCD) panels are flat-panel displays which are used in a variety of products, including consumer electronics, computers, and communication terminals.

When liquid crystal displays are used, a subsystem comprising the drivers for driving the data and the gate lines, a controller for controlling the LCD, and a central processing unit (hereinafter CPU) circuit for controlling the controller and performing the arithmetic and logic processes, is generally required. The controller and the CPU circuit are often comprised of a CPU, ROMs, RAMs, oscillators and resistors.

The structure of an LCD display panel is a simple one. The liquid crystal is encapsulated between two glass substrates, a TFT substrate, and a color-filter/common electrode substrate. That is, the TFT and the color-filter/common electrode substrates are two parallel sheets of glass with liquid crystal injected between them.

More specifically, LCD panels may include: (1) a lower plate on which a plurality of unit cells comprised of switching devices, such as TFTs and picture elements (hereinafter pixels) are arranged; (2) an upper plate comprising color filters, also called the common electrode substrate; (3) liquid crystal injected between these two plates; (4) a polarizing plate which polarizes visible light between the plates; and (5) a backlight for supplying light from one of the plates.

The transparent common electrode on the upper plate/substrate can be made of ITO (Indium Tin Oxide), and is deposited on top of the color filter substrate. In order to obtain good display quality, the cell gap of the liquid-crystal (i.e., the spacing between the two glass substrates) has to be precisely controlled to a specific value. This gap has to be uniform over the whole display area and reproducible from one end to the other. Therefore, transparent spacers, such as plastic beads, are placed on the surface of the glass substrates.

Furthermore, a transparent insulating glass substrate that is pervious to light, is used. Normally, two layers of insulators are formed on a gate electrode. Insulating substrates are used because when light strikes the semiconductor layer, the resulting photoelectric conversion produces a current, thus increasing the amount of off-current. This can cause malfunction in the case of LCD panels. To prevent this problem, the semiconductor layer is completely shielded from light. Another reason for using insulating substrates is for protection of the semiconductor layer during the manufacturing process of other layers such as when drain and source electrodes are formed so that the semiconductor is protected from structural and physical damage.

LCD panels are manufactured under low temperature conditions in order to protect the glass substrates from damage because glass has a relatively large specific gravity and is weakened and brittle when heated.

FIGS. 1A–1C show various types of LCDs. In FIG. 1A, an LCD according to a first related art which uses amorphous silicon thin film transistor (hereinafter TFT) deposited on a glass substrate 100 as the switching device of choice for the pixel array shown.

However, in this situation, the driver in an LCD is required to perform very fast switching operations. Forming the switches using amorphous silicon TFTs is not an appropriate method in order to achieve quick switching operations in an efficient manner. Instead, the use of silicon chips formed by fabricating metal oxide silicon transistors (hereinafter MOS transistors) on silicon wafers attached to a glass substrate 100 where pixels for the LCD have been formed is more desirable. Subsequently, the controller for controlling the drivers and the CPU circuit may be provided by a separate phase of the manufacturing process.

As illustrated in FIG. 1B, a new technique of forming polycrystalline silicon (hereinafter p-Si) under low temperature conditions has been developed. Polycrystalline silicon TFTs are easily fabricated on glass substrates using a number of manufacturing techniques. One of such techniques proposed involves laser crystallization for forming polycrystalline silicon by depositing amorphous silicon on a glass substrate under low temperature conditions and, successively, by scanning the amorphous silicon with a laser beam.

The above-proposed technique enables fabrication of an LCD having a built-in driver because the pixel array comprising the TFT switches and the drivers are directly formed on the glass substrate 100. Unfortunately, a controller made of single crystalline silicon and a CPU circuit are provided by separate processes and on a separate substrate.

In FIG. 1C, another technique for manufacturing a system-on-panel (hereinafter SOP) is shown. This technique enables fabrication of an LCD by mounting a CPU circuit and a controller, comprised of a CPU, ROMs, RAMS, and oscillators on a glass substrate. Accordingly, by forming pixels as an image display and a driver on the glass substrate 100 and mounting a controller, and a CPU circuit to control the pixels on the glass substrate 100, it is possible to fabricate a portable LCD product which is significantly improved in terms of reduced weight and size.

FIG. 2 shows a cross-sectional view of an SOP typed LCD according to a Japanese Publication No. 8-313935. In this cross-sectional illustration, an aluminum layer 2 having patterns corresponding to drain/source wires and contact wires of a CPU circuit oriented in the y-direction is deposited on a glass substrate 1 by sputtering. Next, a polycrystalline silicon layer 3 for a source/drain region is formed by Low Pressure Chemical Vapor Deposition (hereinafter LPCVD). A P+ layer or an N+ layer is formed by doping the p-Si layer 4 with impurity ions, such as boron (B) or phosphorus (P). Another p-Si layer 4 of an active layer is formed on the P+ or the N+ layer by LPCVD. After the p-Si layer 4 has been activated by thermal treatment, a gate insulating silicon oxide layer 5 is formed.

Thereafter, the following layers are formed successively: (1) an aluminum (hereinafter Al) layer 6 comprising the gate electrodes; (2) an Al wire 7 oriented in the y-direction; (3) a mounting pad 8 for a CPU, RAM, ROM, and IC; (4) a lead attachment pad 9; and (5) a bare-chip mounting pad 8 for the resistors, capacitors, oscillators and connectors.

A color filter substrate/common electrode 15 having an ITO layer 16 interposed thereon is formed on an opposite substrate 17. Glass substrate 1 manufactured by the above-described steps is assembled with the opposite substrate 17. The liquid crystal 14 is injected between the color filter substrate/common electrode 15 and the opposite substrate 17. The subcomponents of the LCD panel or module, that is, the peripherals such as the CPU, RAM, ROM, IC, resistors, capacitors, oscillators, connectors and the like, found on the bare chip 11, are fixed to the mounting pad 8. Wires 10 are connected to each successive chip in a process of molding involving resin 12. Finally, polarizing plates 13 and 18 which either transmits or absorbs a specific component of polarized light 13 and 18 are provided.

In the related art described above, after forming the CPU circuit and the controller by a separate semiconductor process, on a wafer of single crystalline silicon, the CPU circuit and the controller consisting of a CPU, RAM, ROM, IC, resistors, capacitors, oscillators, connectors, are attached to a panel of the LCD in order to fabricate an SOP typed LCD.

In the prior art techniques discussed so far, each integrated circuit IC chip (hereinafter IC chip) in a controller and a CPU circuit is fabricated on a silicon wafer by a general semiconductor fabrication process and then subsequently attached to a glass substrate since the controller and the CPU circuit are formed with single crystalline silicon. Accordingly, the process of fabricating pixels and LCD drivers are kept separate from other processes for fabricating the controller and the CPU circuit. The SOP typed LCD manufactured by the foregoing technique reaches the limits of lightness and product miniaturization since the controller and CPU circuit occupy a certain space.

SUMMARY OF THE INVENTION

Accordingly, the present invention is directed to a liquid crystal display of system on panel that substantially obviates one or more of the problems due to limitations and disadvantages of the related art.

The object of the present invention is to provide an SOP typed LCD fabricated by forming all of the required subcomponents of the LCD panel or module on one substrate, namely, a controller, a CPU circuit, the pixel array, and drivers of the LCD panel.

Another object of the present invention is to provide an SOP typed LCD comprising the pixels of the LCD, a driver, a controller and a CPU circuit on a substrate by fabricating the controller and CPU circuit on a glass substrate by using the technique of forming single crystalline silicon on an insulated glass substrate.

Additional features and advantages of the invention will be set forth in the description which follows and will be apparent from the figures provided and the detailed description, or may be learned by practicing of the invention.

To achieve these and other advantages and in accordance with the purpose of the present invention, as embodied and broadly described, the present invention includes a pixel part, a driver, a controller and a CPU circuit wherein the controller and the CPU circuit further include devices which are comprised of active layers of single crystalline silicon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the inventing and together with the description serve to explain the principle of the invention.

DETAILED DESCRIPTION OF THE PREFERRED EMBODIMENTS

Reference will now be made in detail to the preferred embodiment of the present invention, an example of which is illustrated in the accompanying drawings.

The present invention provides an SOP typed LCD fabricated by forming all of the required subcomponents, such as a controller, a CPU circuit, and both pixels and a driver of an LCD panel on a substrate. Particularly, an SOP typed LCD is manufactured by fabricating pixels of the LCD, a driver, a controller and a CPU circuit simultaneously on preferably a transparent insulated glass substrate.

As mentioned above, a controller and CPU circuit including a CPU, ROM, RAM must be made of single crystalline silicon in order to be operated under a high frequency. A prior art technique for fabricating an SOP typed LCD includes the steps of separately forming a chip on a wafer of single crystalline silicon by a semiconductor fabrication process and the step of attaching the chip to an LCD substrate. The controller and the CPU circuit of the SOP typed LCD are fabricated by a separate process in prior art methods because it is very difficult to form single crystalline silicon on a glass substrate.

However, if fabrication of a built-in SOP typed LCD in which a controller and a CPU circuit are formed on the glass substrate is possible, then this new technique for forming single crystalline silicon on a glass substrate enables the fabrication of the controller and the CPU circuit of the SOP typed LCD in the same process as the fabrication of the semiconductor and LCD substrate.

There are several techniques for forming single crystalline silicon on a glass substrate. Sequential Lateral Solidification is one technique that forms the silicon layer, by applying laser to an amorphous silicon layer. Here, the displacement of the laser beam is shorter than the length of lateral growth of the crystal. Consequently, silicon particles which are longer than 10 $\mu$m are formed on a glass substrate. The foregoing technique is disclosed in "Crystalline Si Films For Integrated Active Matrix Liquid-Crystal Displays," MRS Bulletin, Volume XXI, Number 3, March 1996, pp. 39~48.

Moreover, the location, size, and shape of a crystal particle may be controlled by manipulating the shape of a slit through which a laser beam passes, which enables the formation of silicon particles that are larger than an active area of a TFT. Thus, it is possible to fabricate a TFT of single crystalline silicon manufactured by forming an active area of the TFT as a single crystal particle.

Figure 1A:
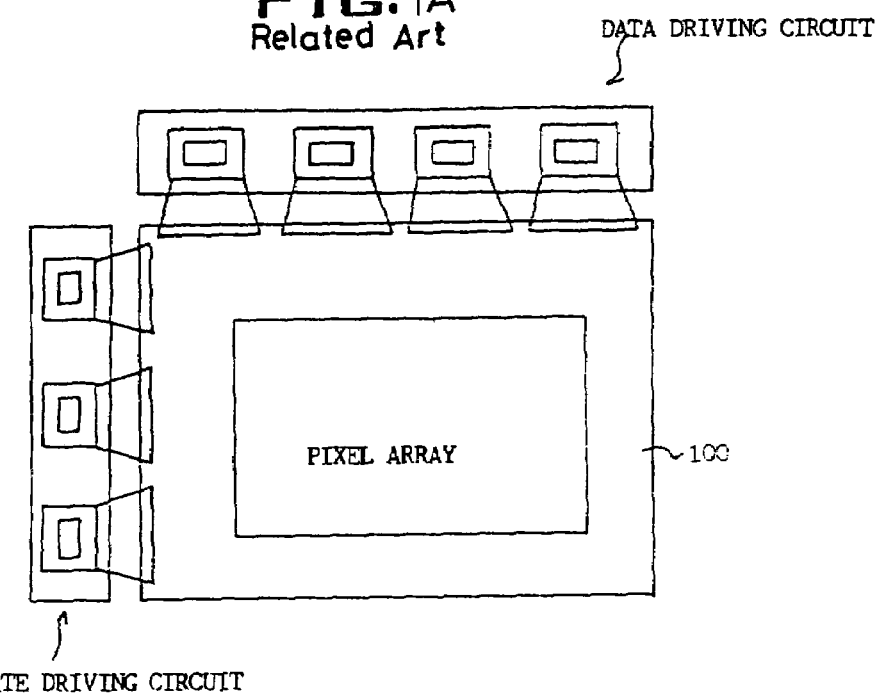
FIGS. 1A–1C show various types of LCD.
Figure 1B:
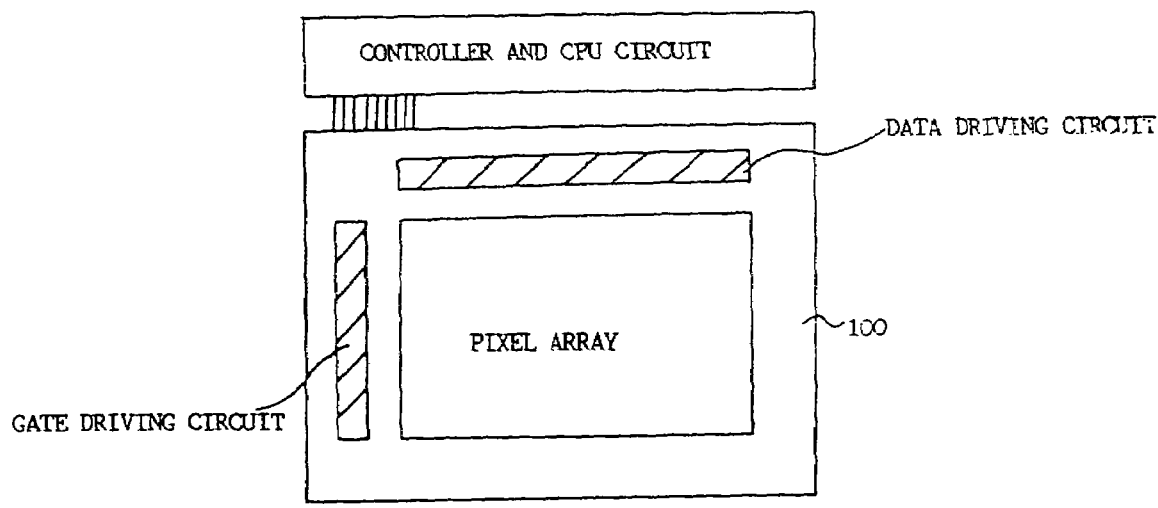
Figure 1C:
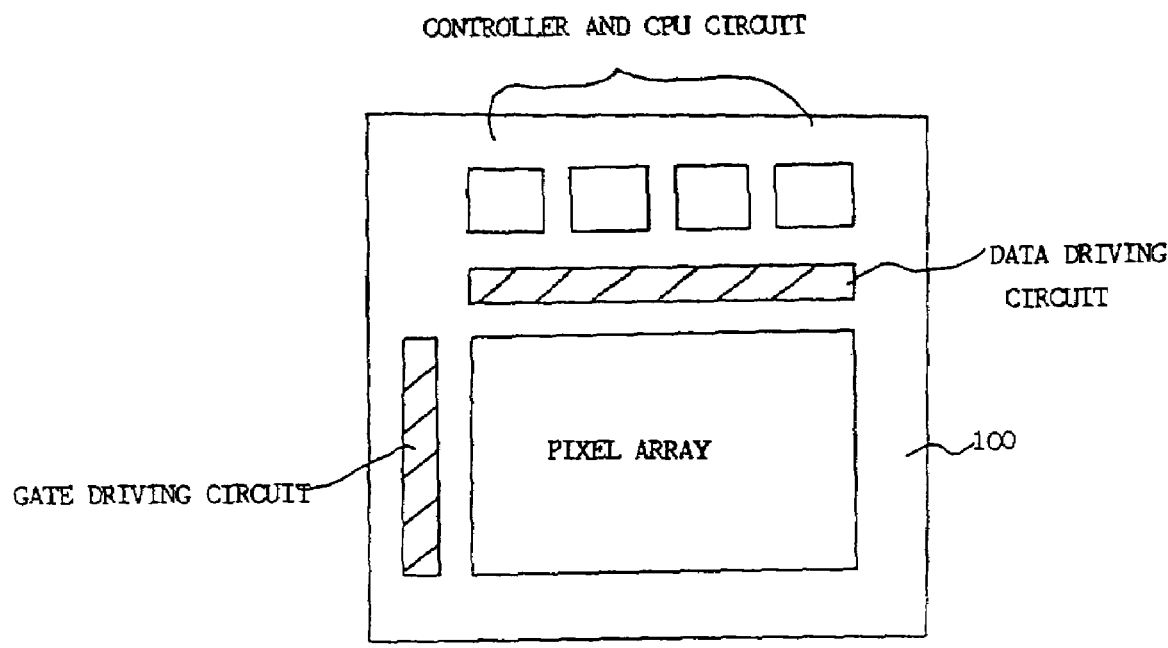
Figure 2:
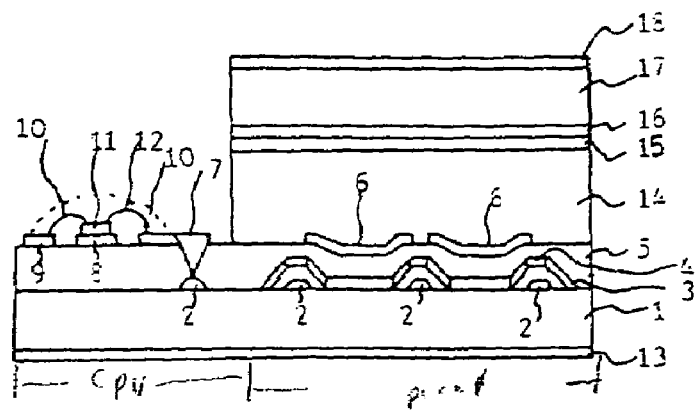
FIG. 2 shows a cross-sectional view of an SOP typed LCD according to a related art.
Figure 3A:
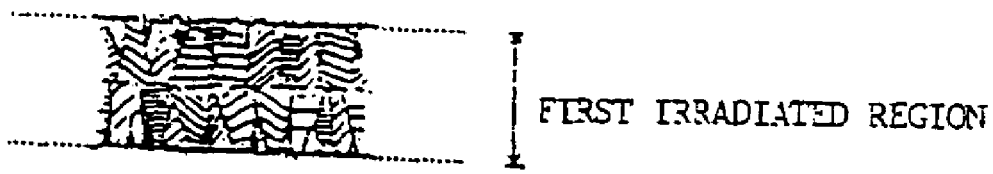
FIGS. 3A–3C illustrate the method for crystallizing an amorphous silicon film by Sequential Lateral Solidification (SLS) technique.
Figure 3B:
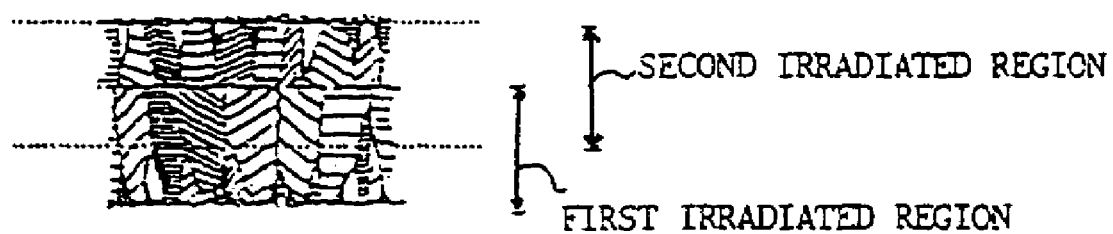
Figure 3C:
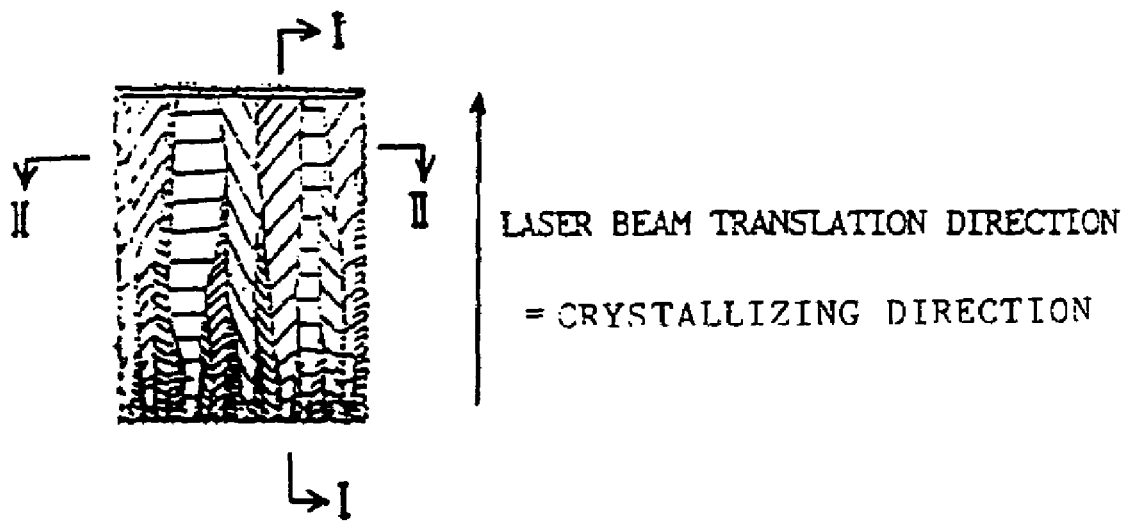

FIGS. 3A–3C show the method for crystallizing an amorphous silicon film by the Sequential Lateral Solidification (SLS) technique. The technique of forming a single crystalline silicon layer on a glass substrate by SLS is well-known in the art, as is described in "Single Crystal Si Films Via A Low-Substrate-Temperature Excimer-Laser Crystallization Method," by Robert S. Sposilli, M. A. Crowder, and James S. Im, Mat. Res. Soc. Symp. Proc., Vol. 452, pp. 956–7, 1997.

The SLS technique used in the present invention relies on the fact that silicon grains tend to grow vertically against the interface between liquid and solid silicon, and that an amorphous silicon layer is crystallized by controlling the magnitude of laser energy and irradiation range of a moving laser beam in order to maintain the growth of silicon grains laterally for a predetermined length. This phenomenon is embodied in the present invention.

As seen in FIG. 3A, the narrow region having a straight slit film shape bounded by the dashed lines is the first irradiated region. This first irradiated region is irradiated at an energy density sufficient to induce complete melting. Subsequently, lateral grain growth proceeds from the unmelted regions adjacent to the narrow strip which has been fully melted. The grain boundaries in the directionally solidified materials tend to form in order to be maintained perpendicularly to the melting interface. Depending on the width of the molten region, lateral growth ceases to occur with either of two situations: (1) the two opposing growth fronts collide at the center, or (2) the molten region becomes sufficiently supercooled so that bulk nucleation of solids occur, whichever occurs first. Because of such considerations, the maximum lateral growth distance which can be achieved with a single-pulse is limited to less than certain length, depending on the film thickness and the incident energy density.

In FIG. 3B, the film is translated relative to the beam image over a distance of less than the single-pulse lateral growth distance, and then irradiated again. As lateral growth begins again from the edges of the completely molten region located within the grains grown during the previous irradiation step, the length of the grains increases beyond the single-pulse lateral growth distance.

In FIG. 3C, the above-described processes of irradiation and solidification can be repeated indefinitely, leading to grains of any desired length. FIG. 3C shows the final microstructure which results from the described process.

Figure 4A:
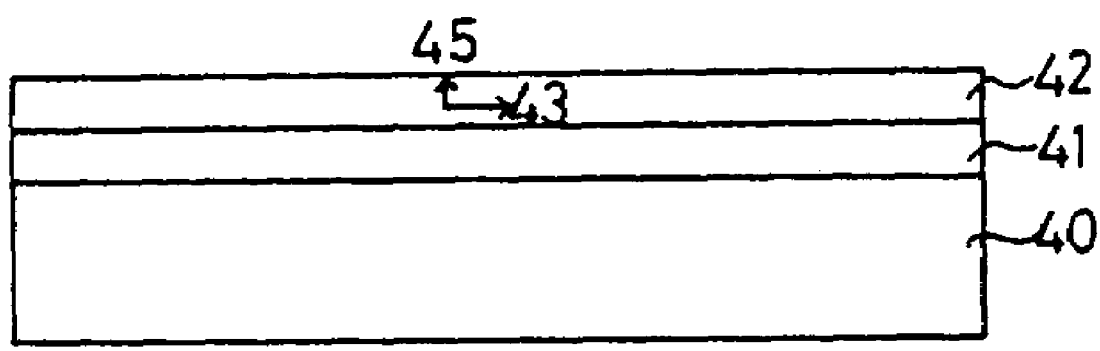
FIGS. 4A–4B show cross-sectional drawings along the line I—I and II—II as shown in FIG. 3C.
Figure 4B:
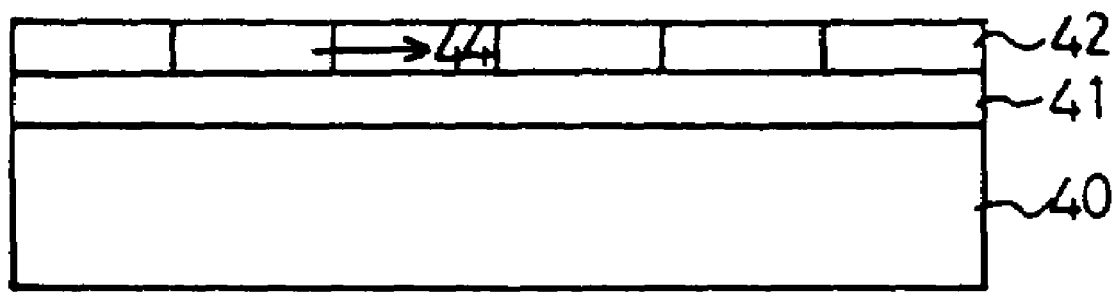

FIGS. 4A and 4B show the cross-sectional drawings along the lines I—I and II—II of FIG. 3C. Here, a silicon layer 42, formed by SLS crystallization technique is superimposed on an insulating layer 41, which is in turn, located on an insulating substrate 40.

According to the SLS technique used herein, the silicon grains proceed by means of lateral grain growth. Thus, the grain boundaries in directionally solidified materials tend to form perpendicularly to the melt interface. A single pulse grain growth is larger than the thickness of the amorphous silicon film.

Therefore, the SLS silicon thin film 42, as shown in FIG. 4A, has no boundary in both a first direction 43, i.e., the crystallizing direction (in FIG. 3C), and a second direction 45 which is longitudinal to the substrate. The only silicon grain shown in the silicon thin film 43 in FIG. 4A, which is a cross-sectional drawing along the line I—I in FIG. 3C.

However, the SLS silicon thin film 42 has a plurality of boundaries in a third direction 44, i.e., the perpendicular direction to the first direction 43, the crystallizing direction.

Therefore, a plurality of silicon grains may be shown in the silicon thin film 42 in FIG. 4B, which is a cross-sectional drawing along the line II—II in FIG. 3C.

There is another technique for forming single crystalline silicon on a glass substrate, as disclosed in Korean Patent Application No. 97-18244 and its counterpart U.S. application Ser. No. 09/048,321 filed on Mar. 26, 1998 and which are incorporated herein by reference. Therefore, it is also possible to fabricate a controller and a CPU circuit built in an LCD by the above-mentioned technique for forming single crystalline silicon on glass substrates.

Figure 5:
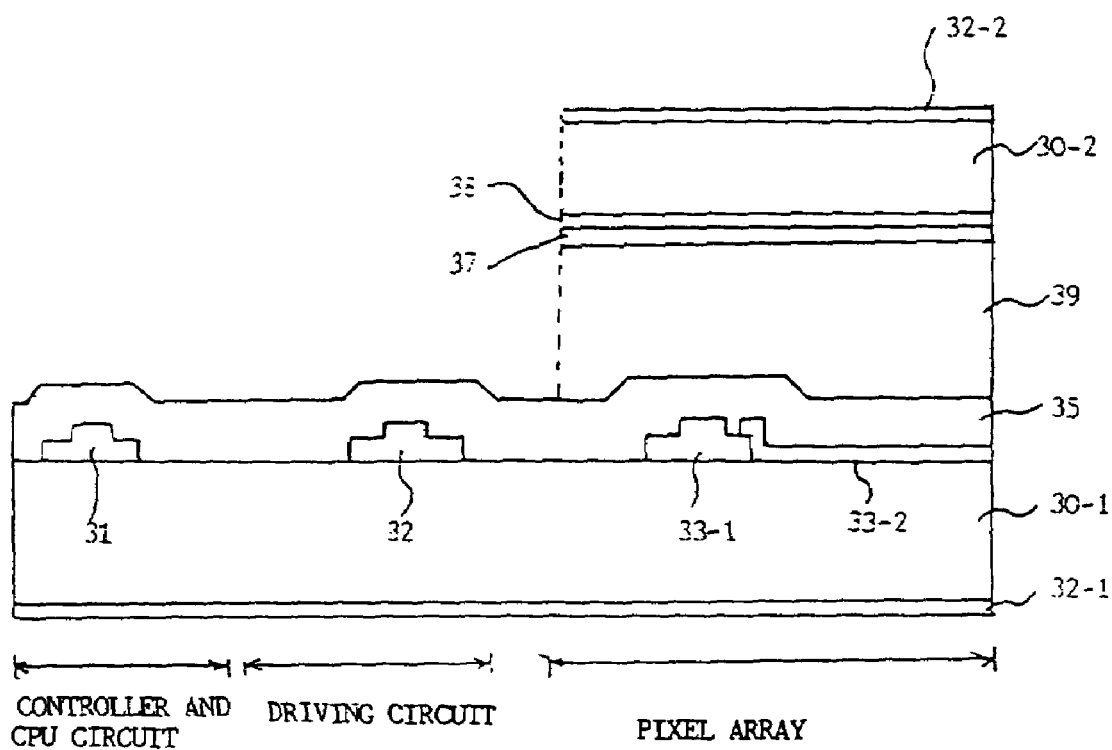
FIG. 5 shows a cross-sectional view of an SOP typed LCD according to an embodiment of the present invention.

FIG. 5 shows an SOP typed LCD according to an embodiment of the present invention, wherein the SOP typed LCD includes a pixel arrangement, a driver, a controller and a CPU circuit on a glass substrate.

Referring to FIG. 5, a pixel part, a driver, a controller and a CPU circuit are defined on an insulated substrate, and predetermined devices are formed on each defined part. Specifically, a switching device 33-1 and a pixel electrode 33-2 which form a pixel cell are formed in the pixel part. A device 32 driving each pixel actively is formed in the driver. A device 31 which forms a CPU, RAM, ROM, IC, resistors, capacitors, oscillators, connectors and the like is formed in the controller and the CPU circuit. FIG. 5 shows only a portion of the foregoing devices.

Each device is fabricated on a glass substrate 30-1, which serves as the insulated substrate for the same process. Here, each active layer for each of the devices may be formed with single crystalline or polycrystalline silicon. In particular, the controller and the CPU circuit may be made of single crystalline silicon because of the characteristic of the devices themselves, while active layers of the devices of the pixel part may be formed with amorphous silicon, poly crystalline silicon or single crystalline silicone. A technique for forming polycrystalline silicon on a glass substrate is already well-known in the art. Other techniques for forming single crystalline silicon on glass substrates are being developed and will provide newer techniques in the future that can be used in conjunction with the method of the present invention.

The process of forming each device is similar to a conventional process of fabricating LCD or semiconductors. However, to form an SOP typed LCD, a new fabrication process for simultaneously forming a pixel part, a driver, a controller and a CPU circuit on a same substrate is proposed in the present invention.

As illustrated in FIG. 5, a first substrate on which a passivation layer 35 covering the above-mentioned device lies, is prepared. Corresponding to the first substrate 30-1, a second substrate 30-2 comprising an ITO layer 37 and a color filter 38 is assembled and placed parallel to the first substrate. Liquid crystal 39 is injected between the first substrate 30-1 and the second substrate 30-2. Polarizing plates 32-1 and 32-2 are attached to the outsides of the two substrates, respectively.

The above-described embodiment indicates one possible example of the various embodiments that can come within the teachings and scope of the present invention. Accordingly, the present invention enables fabrication of TFTs of various types as switching devices for the pixel parts, as well as an overlapped structure or material for LCD panels.

Figure 6:
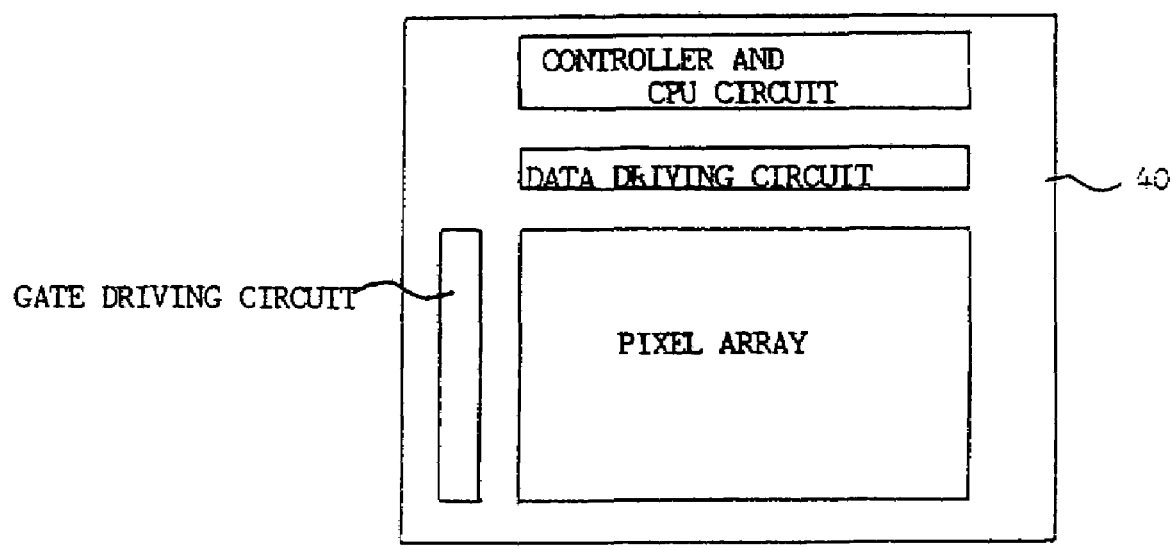
FIG. 6 shows a schematic cross-sectional view of a first substrate of the SOP typed LCD as shown in FIG. 3.

The first substrate of the above-explained SOP typed LCD, as shown in FIG. 6, shows that a pixel array, data and gate driver circuits, a controller and CPU circuit are preferably formed on a single insulated substrate 40. In the present invention, active layers of the devices in a controller and CPU circuit are preferably formed with single crystalline silicon, other active layers of the devices in a driver are formed with single crystalline silicon or polycrystalline silicon, and further active layers of the devices in the pixel array may be formed with at least one of single crystalline, polycrystalline and amorphous silicon. Namely, the active layers of the driver and the pixel array may be formed with a non-single crystalline silicon, such as microcrystalline silicon.

In this case, as mentioned in the foregoing descriptions, the active layers of the devices in the driver and the pixel part may be formed with single crystalline silicon in the same manner of the controller and the CPU circuit.

The present invention enables fabrication of a pixel part, a driver, a controller and a CPU circuit on one substrate, whereby the fabrication process is simplified and efficient production and manufacture is increased. Moreover, the present invention makes possible the fabrication of portable LCD products which are significantly reduced in weight and size since the surface area and space occupied by the controller and the CPU circuit is minimized.

It will become apparent to those skilled in the art that various modifications and variations can be made in a SOP typed liquid crystal display of the present invention without departing from the spirit or scope of the inventions. Thus, it is intended that the present invention cover the modifications and variations of this invention provided they come within the scope of the appended claims and equivalents.

What is claimed is:

1. A method of fabricating a system-on-panel typed liquid crystal display comprising:
   providing a substrate including at least first, second and third regions;
   forming a pixel array directly on the substrate in the first region;
   depositing and crystallizing amorphous silicon on the substrate to form a driver directly on the substrate in the second region; and
   depositing and crystallizing amorphous silicon on the substrate to form a control unit directly on the substrate in the third region,
   wherein the pixel array, driver and control unit are formed simultaneously.

2. The method according to claim 1, wherein the control unit includes an active layer formed of single crystalline silicon.

3. The method according to claim 1, wherein the pixel array has an active layer formed on single crystalline silicon.

4. The method according to claim 1, wherein the driver has an active layer formed of polycrystalline silicon.

5. The method according to claim 1, wherein the pixel array has an active layer formed of polycrystalline silicon.

6. The method according to claim 1, wherein the pixel array has an active layer formed of amorphous silicon.

7. The method according to claim 1, wherein the control unit includes a central processing unit.

8. The method according to claim 1, wherein the driver has an active layer formed of single crystalline silicon.

9. The method according to claim 1, wherein the substrate includes glass.

10. A method of fabricating a system-on-panel typed liquid crystal display comprising:
    providing a substrate including at least first, second and third regions;
    forming a pixel array directly on the substrate in the first region;
    depositing and crystallizing amorphous silicon on the substrate to form a driver directly on the substrate in the second region; and
    depositing and crystallizing single crystalline silicon on the substrate to form a control unit directly on the substrate in the third region,
    wherein the pixel array, driver and control unit are formed simultaneously.

11. The method according to claim 10, wherein the control unit includes a central processing unit.

12. The method according to claim 10, wherein the pixel array has an active layer formed of single crystalline silicon.

13. The method according to claim 12, wherein the driver has an active layer formed of polycrystalline silicon.

14. The method according to claim 10, wherein the driver has an active layer formed of polycrystalline silicon.

15. The method according to claim 10, wherein the pixel array has an active layer formed of polycrystalline silicon.

16. The method according to claim 15, wherein the driver has an active layer formed of polycrystalline silicon.

17. The method according to claim 10, wherein the pixel array has an active layer formed of amorphous silicon.

18. The method according to claim 17, wherein the driver has an active layer formed of polycrystalline silicon.

19. The method according to claim 17, wherein the driver has an active layer formed of single crystalline silicon.

20. The method according to claim 10, wherein the substrate includes glass.

21. A method of fabricating a system-on-panel liquid crystal display, comprising:
    providing a substrate including at least first, second and third regions;
    forming a pixel array directly on the substrate at the first region, the pixel array having an active layer including amorphous silicon deposited on the substrate;
    forming a driver directly on the substrate at the second region, the driver having an active layer including polysilicon or single crystalline silicon deposited on the substrate; and
    forming a control unit directly on the substrate at the third region, the control unit having an active layer including polysilicon or single crystalline silicon deposited on the substrate, wherein the control unit includes switching devices having at least one active layer,
    wherein the pixel array, driver and control unit are formed simultaneously on the substrate.

22. The method according to claim 21, wherein the pixel array active layer further includes polysilicon or single crystalline silicon.

23. The method according to claim 21, wherein the substrate includes glass.

24. A method of fabricating a system on panel liquid crystal display comprising:
    providing a substrate including at least first, second and third regions;
    forming a pixel array directly on the substrate at the first region, the pixel array having an active layer including amorphous silicon deposited on the substrate;
    forming a driver directly on the substrate at the second region, the driver having an active layer including polysilicon or single crystalline silicon deposited on the substrate; and
    forming a control unit directly on the substrate at the third region, wherein the control unit includes switching devices having at least one active layer formed of single crystalline silicon;
    wherein the pixel array, driver and control unit are formed simultaneously on the substrate.

25. The method according to claim 24, wherein the pixel array active layer further includes polysilicon or single crystalline silicon.

26. The method according to claim 24, wherein the substrate includes glass.

* * * * *